US008339309B2

(12) United States Patent
McCandliss

(10) Patent No.: US 8,339,309 B2
(45) Date of Patent: Dec. 25, 2012

(54) GLOBAL COMMUNICATION SYSTEM

(76) Inventor: Brian McCandliss, West Bloomfield, MI (US)

( * ) Notice: Subject to any disclaimer, the term of this patent is extended or adjusted under 35 U.S.C. 154(b) by 137 days.

(21) Appl. No.: 12/889,629

(22) Filed: Sep. 24, 2010

(65) Prior Publication Data
US 2011/0068972 A1 Mar. 24, 2011

Related U.S. Application Data

(60) Provisional application No. 61/245,474, filed on Sep. 24, 2009.

(51) Int. Cl.
*H04B 7/185* (2006.01)
*H04B 7/19* (2006.01)
(52) U.S. Cl. .......................... 342/354; 342/356
(58) Field of Classification Search .................. 342/352, 342/354, 356; 455/12.1, 13.3
See application file for complete search history.

(56) References Cited

U.S. PATENT DOCUMENTS

| 4,813,036 A | 3/1989 | Whitehead |
| 4,868,886 A | 9/1989 | Assal et al. |
| 4,931,802 A | 6/1990 | Assal et al. |
| 5,612,701 A | 3/1997 | Diekelman |
| 6,047,162 A | 4/2000 | Lazaris-Brunner et al. |
| 6,243,366 B1 | 6/2001 | Bradley et al. |
| 6,374,104 B1 | 4/2002 | Croq et al. |
| 6,452,540 B1 | 9/2002 | Harmon et al. |
| 6,653,975 B2 | 11/2003 | Branscombe et al. |
| 6,704,543 B1 | 3/2004 | Sharon et al. |
| 7,020,462 B1 | 3/2006 | Wesel |
| 7,177,592 B2 | 2/2007 | Jarett |
| 2007/0192805 A1 | 8/2007 | Dutta et al. |
| 2008/0064328 A1* | 3/2008 | Wesel .......................... 455/13.3 |
| 2008/0278397 A1 | 11/2008 | Rao et al. |

FOREIGN PATENT DOCUMENTS

WO 2006123064 A1 11/2006

* cited by examiner

*Primary Examiner* — Dao Phan
(74) *Attorney, Agent, or Firm* — Howard & Howard Attorneys PLLC

(57) ABSTRACT

A global communication satellite system includes at least three communication satellites. Each communication satellite is disposed in a geostationary orbit about the Earth. Each communication satellite also includes a feed horn array having at least 4,000 feed horns with each feed horn capable of transmitting at least one radio frequency (RF) signal. The feed horn array produces a plurality of spot beams with each spot beam corresponding to a spot beam area on the surface of the Earth. Each spot beam area has a generally circular shape with a diameter less than 150 miles. Furthermore, each spot beam area overlaps with a plurality of other spot beams areas such that plurality of spot beams provide saturation coverage of all populated land areas of the Earth.

16 Claims, 6 Drawing Sheets

GLOBAL COMMUNICATION SYSTEM

CROSS REFERENCE TO RELATED APPLICATION

This application claims the benefit of provisional patent application No. 61/245,474, filed Sep. 24, 2009, which is hereby incorporated by reference.

BACKGROUND OF THE INVENTION

1. Field of the Invention

The subject invention relates to communication satellite systems.

2. Description of the Related Art

Communication satellites have long been used to transmit radio frequency (RF) signals to the Earth. For example, these satellites are utilized to provide satellite television (e.g., Dish Network and DirecTV) and radio services (e.g. Sirius XM). These satellites typically provide a large coverage area of the surface of the Earth on the order of a thousand square miles. As such, each of these RF signals provides the exact same content across the coverage area. Thus, local advertising is typically not possible using these large coverage area satellites.

Furthermore, these satellites transmit a constant signal strength toward the surface. This often leads to poor reception at certain areas, especially due to atmospheric interference such as rain storms. The subject invention provides solutions to these and other deficiencies of prior art communication satellite systems.

BRIEF SUMMARY

A global communication satellite system includes at least three communication satellites. Each communication satellite is disposed in a geostationary orbit about the Earth. Each communication satellite also includes a feed horn array having at least 4,000 feed horns with each feed horn capable of transmitting at least one radio frequency (RF) signal. The feed horn array produces a plurality of spot beams with each spot beam corresponding to a spot beam area on the surface of the Earth. Each spot beam area has a generally circular shape with a diameter less than 150 miles. Furthermore, each spot beam area overlaps with a plurality of other spot beams areas such that plurality of spot beams provide saturation coverage of all populated land areas of the Earth.

BRIEF DESCRIPTION OF THE DRAWINGS

Other advantages of the disclosed subject matter will be readily appreciated, as the same becomes better understood by reference to the following detailed description when considered in connection with the accompanying drawings wherein.

DETAILED DESCRIPTION

Referring to the Figures, wherein like numerals indicate like parts throughout the several views, global communications system 10 is shown herein.

Figure 1:
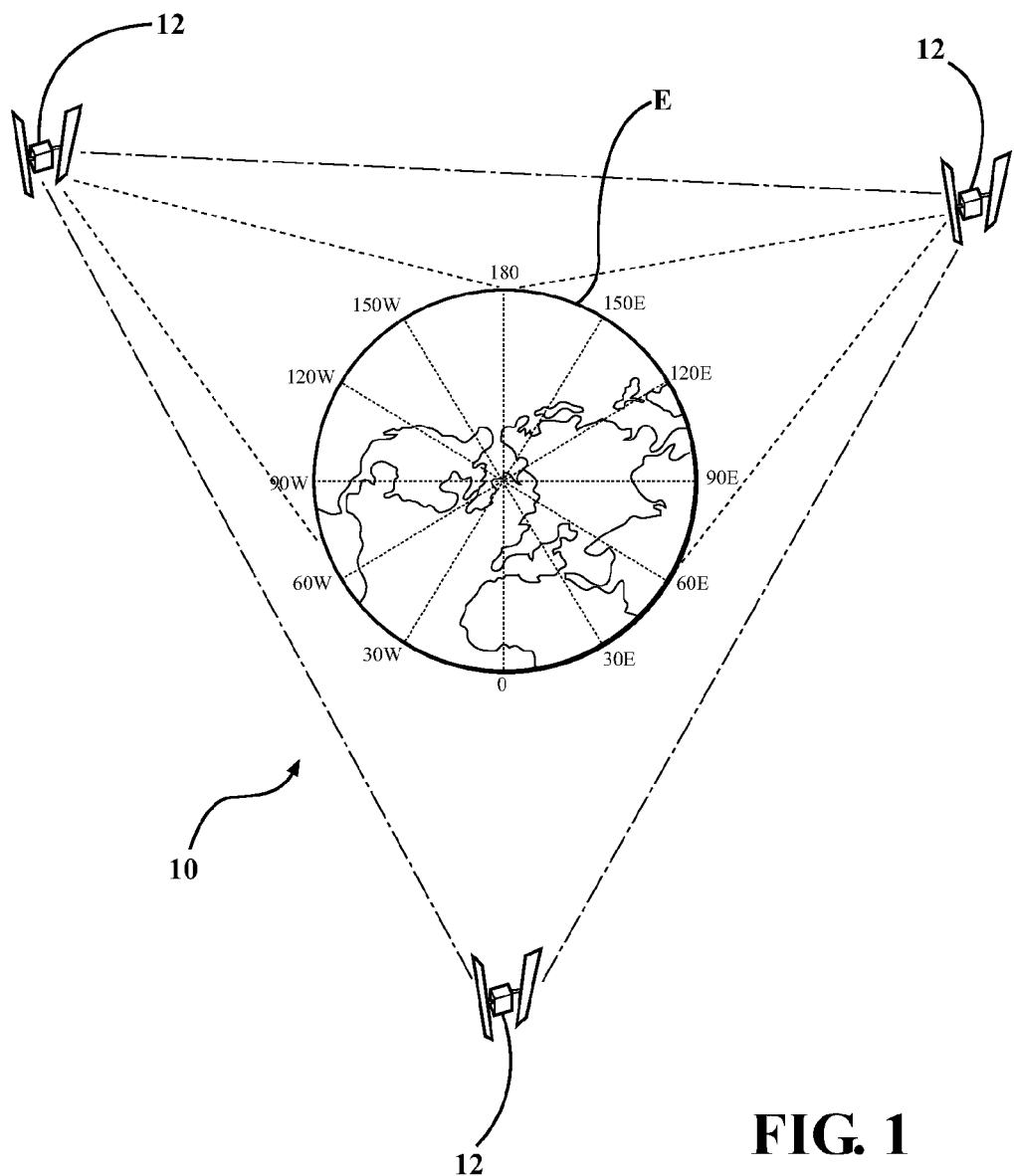
FIG. 1 is an overview of a first embodiment of a global communication system utilizing three satellites.
Figure 2:
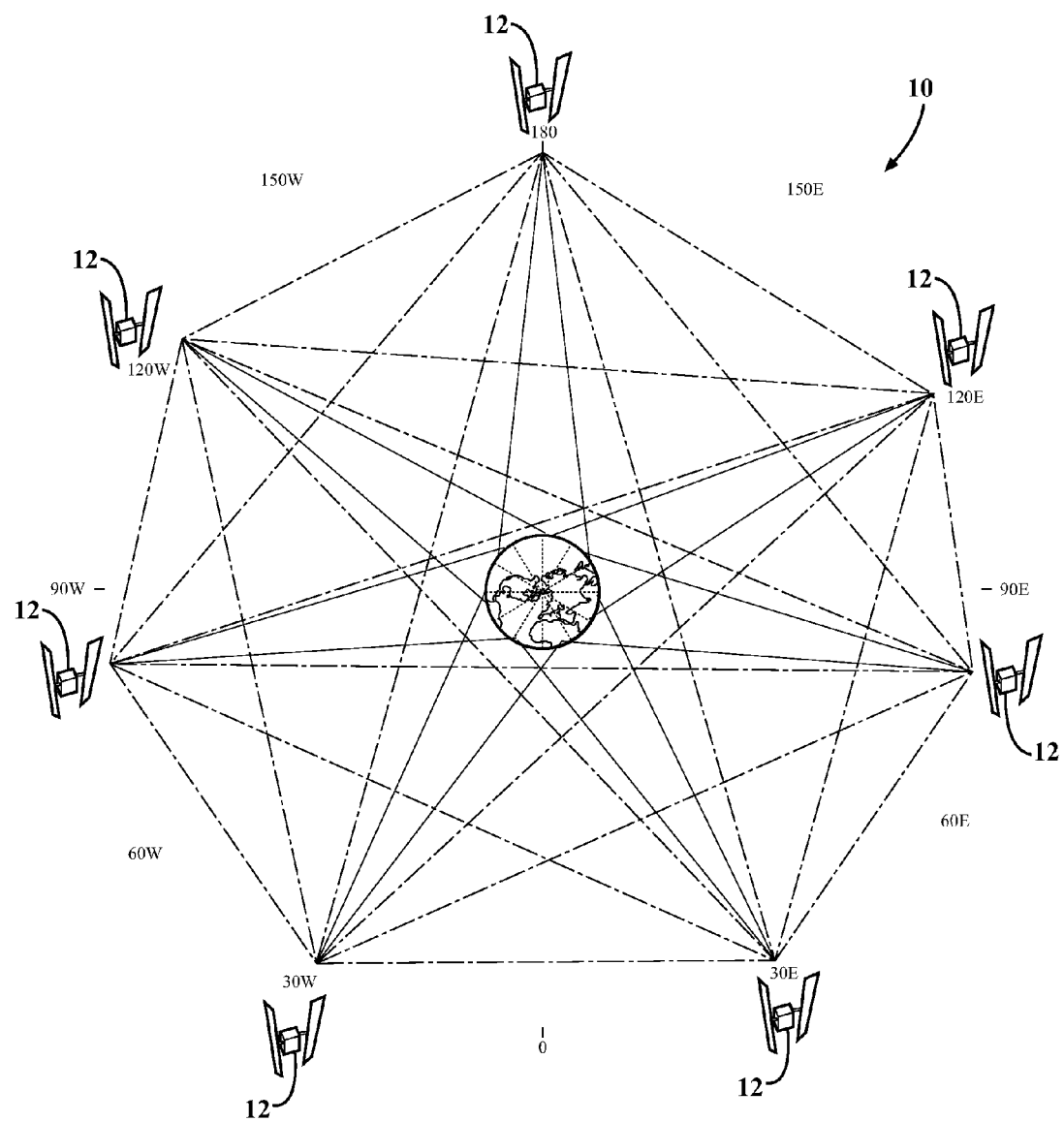
FIG. 2 is an overview of a second embodiment of the global communication system utilizing seven satellites.
Figure 3:
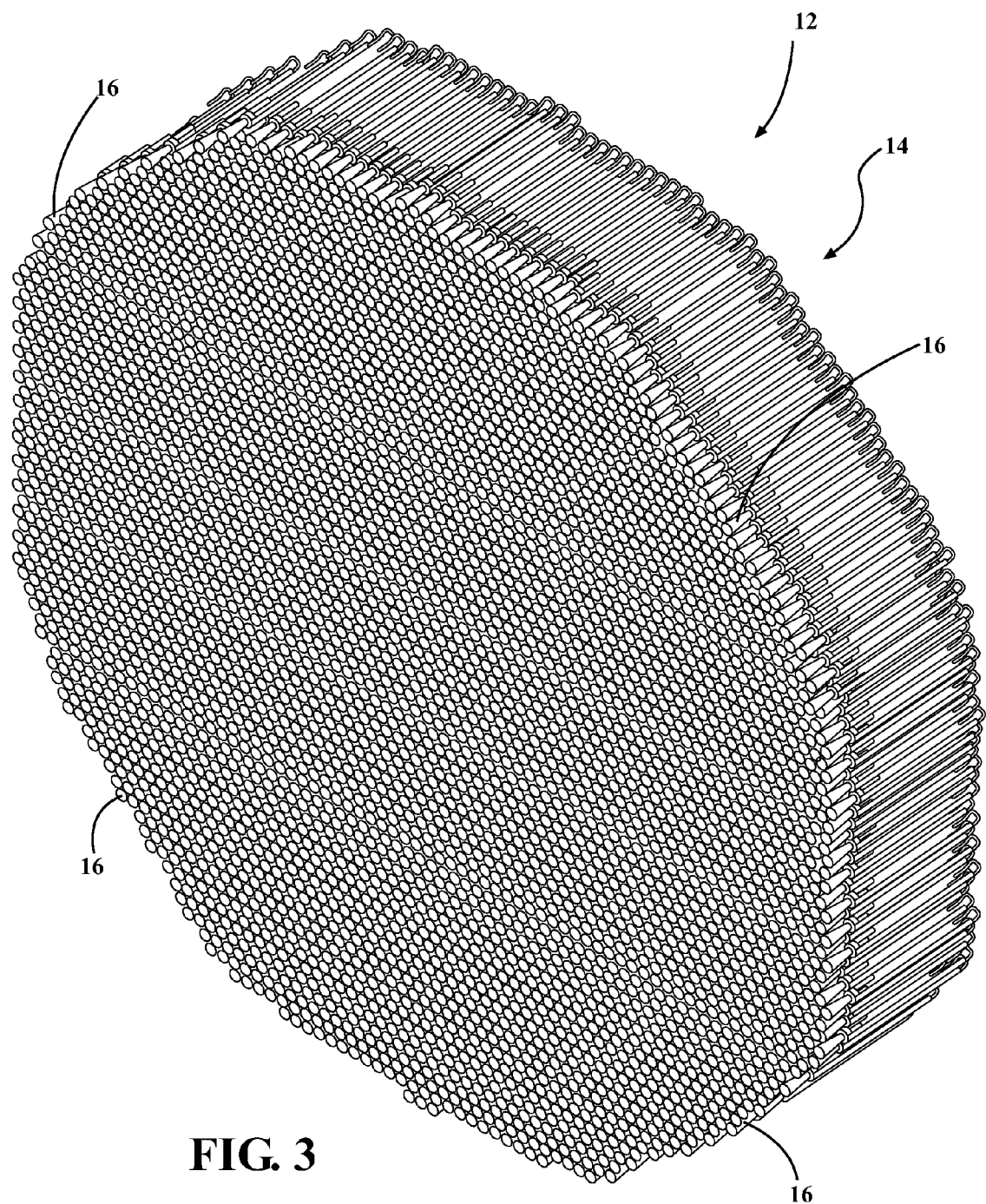
FIG. 3 is a perspective view of a plurality of feed horns of one of the satellites of the global communication system.

Referring to FIGS. 1 and 2, the system 10 includes at least three communication satellites 12. Each communication satellite 12 is disposed in an orbit about the Earth. Preferably, each communication satellite 12 is disposed in a geostationary orbit around the Earth. More preferably, each communication satellite 12 is disposed in the geostationary orbit above the equator of the Earth, such that the North Pole and the South Pole of the Earth are about equidistant.

Each satellite 12 preferably includes a power source (not shown), e.g., solar panels, to provide power to the satellite 12. Each satellite 12 also preferably includes one or more microprocessors (not shown) to provide computation of data as is well known to those skilled in the art. Many other details of the satellites 12 are omitted In a first embodiment, as shown in FIG. 1, the system 10 utilizes three communication satellites 12. Each communication satellite 12 may transmit and/or receive radio frequency (RF) signals with about ⅓ of the surface of the Earth as described in further detail below. That is, a coverage area of each satellite 12 is about 65,629,300 square miles (170,024,000 square kilometers). The three communication satellites 12 are spaced in geostationary orbits that are about 120 degrees from one another. That is, the satellites are angularly offset by about 120 degrees. As such, the satellites may transmit and/or receive RF signals from just about any location on the Earth. However, the satellites 12 need not be disposed exactly 120 degrees from one another. Those skilled in the art realize that the operation and global functionality of the system 10 may be achieved with variation in the angular offset between the satellites 12.

The RF signals transmitted and/or received by each satellite 12 may encode numerous types of data and signals. For example, the RF signals may transmit and/or receive video data (e.g., television) and audio data (e.g., telephone conversations or radio broadcasts). Those skilled in the art realize numerous other data and signals that may be encoded by the RF signals.

FIG. 1 shows the satellites 12 located in orbital slots at 0 degrees longitude (the Prime Meridian), 120 degrees East longitude, and 120 degrees West longitude. Of course, the three satellites 12 of the first embodiment may be located at other orbital slots.

In a second embodiment, as shown in FIG. 2, the system 10 utilizes seven communication satellites 12. As with the first embodiment, each satellite 12 of the second embodiment may transmit and/or receive RF signals with about ⅓ of the Earth. However, since seven satellites 12 are utilized, an overlap between the coverage areas, to provide redundancy and higher RF signal strengths at more locations on the surface of the Earth.

In the first and second embodiments, each communication satellite 12 includes a feed horn array 14 having at least 4,000 feed horns 16. Each feed horn 16 is capable of transmitting and/or receiving at least one radio frequency (RF) signal. Preferably, the feed horn array 14 includes 4,310 feed horns 16. Each feed horn 16 produces a spot beam, i.e., an RF signal that is concentrated in power over a limited geographic area. The geographic area covered by the spot beam is referred to as the spot beam area 20.

Figure 4:
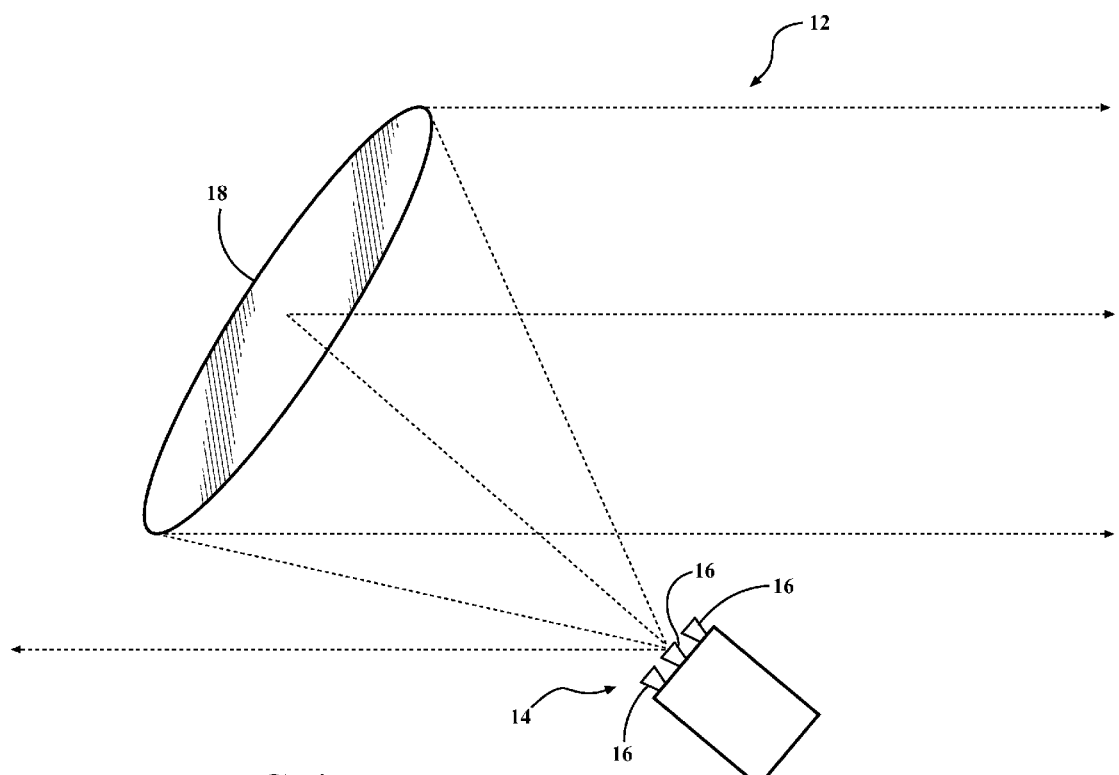
FIG. 4 is a block diagram showing a modified-spheroid parabolic reflector one of the satellites in communicative relationship with the plurality of feed horns.

Each satellite 12 includes a modified-spheroid parabolic reflector 18, as shown in FIG. 4. The RF signals transmitted or received by the feed horns 16 are reflected off the reflector 18. Use of this reflector 18 provides a maximum gain of about 55 dB at each feed horn 16.

The feed horn array 14 produces a plurality of spot beams directed toward the surface of the Earth. More specifically, each feed horn 16 produces a spot beam area 20 having a generally circular shape with a diameter less than 150 miles. The term "generally circular" means that the sport beam area may be an ellipse, an oval, or other shape as is readily recognized by those skilled in the art. The spot beam area 20 may alternatively be referred to as a cell. Preferably, each feed horn 16 produces a spot beam area 20 having a diameter of about 111 miles. This area 20 is smallest possible area feasible for RF signal transmission and reception (i.e., uplinks and downlinks). However, the spot beam area 20 may be made larger than 111 miles to cover a wider area. This may be advantageous when the spot beam area 20 covers mostly unpopulated areas, e.g., oceans or deserts.

Of course, due to the curvature of the Earth, the shape and diameter of each spot beam area 20 may vary somewhat. That is, the size of the spot beam area may vary with factors such as the latitude and longitude of the spot beam area with respect to the satellite position. Other factors, such as RF propagation factors and the strength of the RF signal, may also alter the shape and diameter of each spot beam area 20.

Since each of the spot beam areas 20 preferably has a diameter of less than 150 miles, each spot beam covers approximately the same area as a local, terrestrial-based television or radio station. As such, each spot beam may carry local broadcast data, e.g., local broadcast content or local advertising.

In addition to transmitting RF signal, at least one of the feed horns 16 may receive an RF signal from the respective spot beam area 20, as alluded to above. The signal received by the feed horn 16 may contain instructions for the satellite 12, contain data or a signal to be rebroadcast to the surface of the Earth via one of the feed horns 16, or contain data or a signal to be sent to another of the satellites 12, as described in further detail below.

Figure 5:
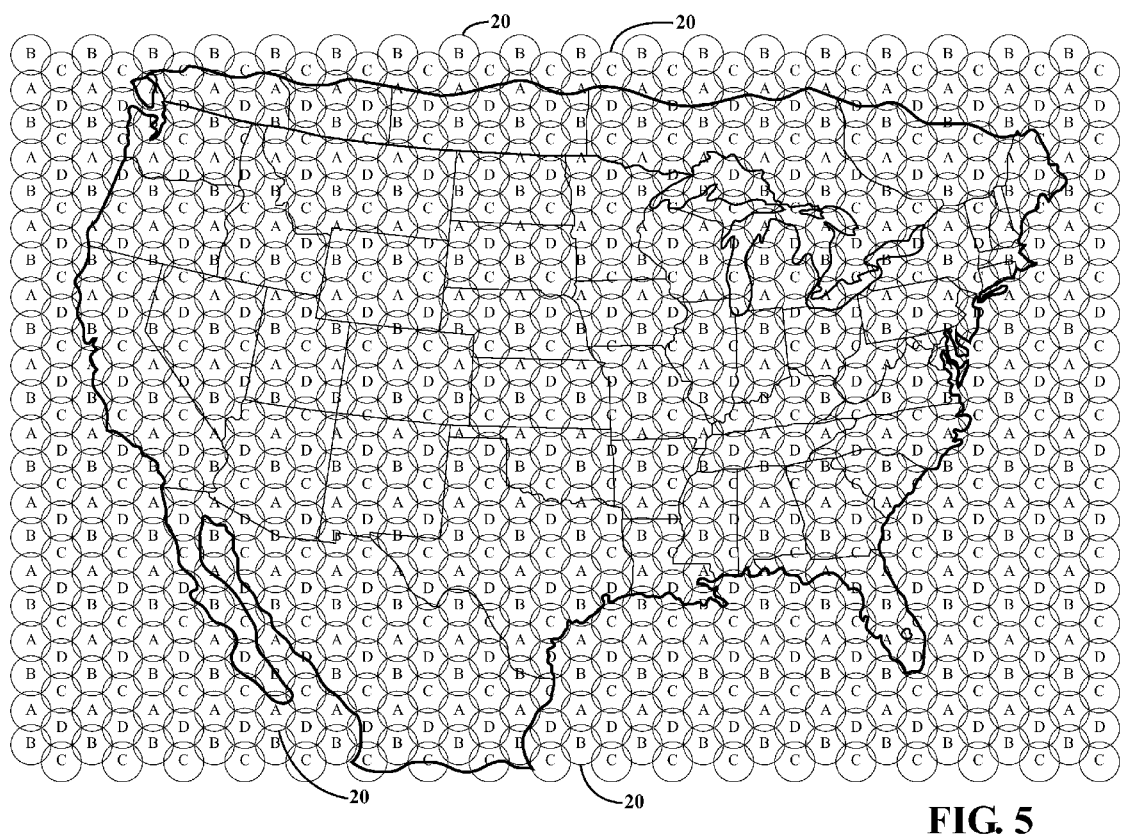
FIG. 5 is a close-up geographic map showing a plurality of feed horn areas on the surface of the Earth produced by the plurality of feed horns.
Figure 6:
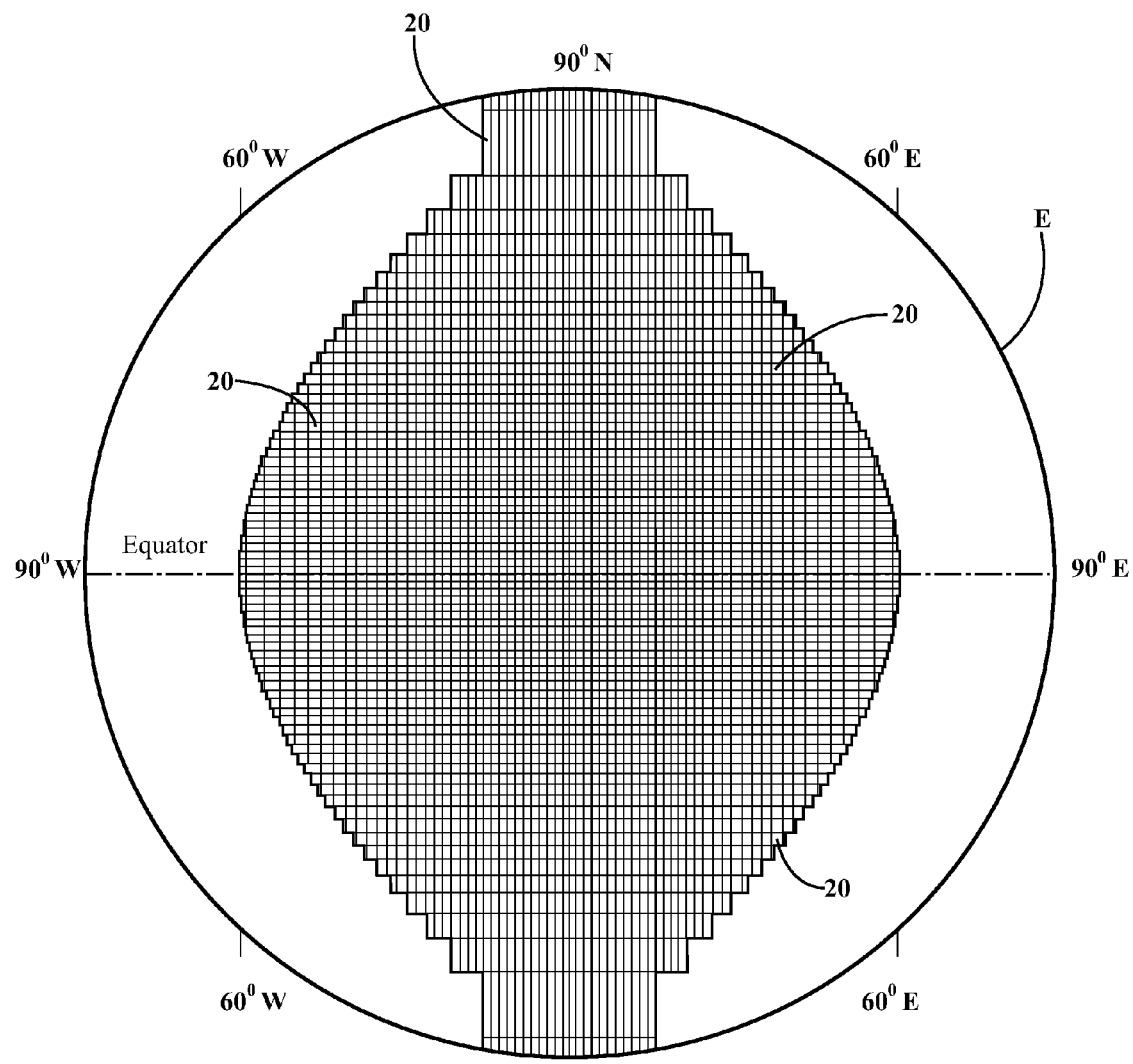
FIG. 6 is an overview geographic map showing the plurality of feed horn areas of one of the satellites produced by the plurality of feed horns.

As shown in FIG. 5, each of the spot beam areas 20 overlaps with a plurality of other spot beam areas 20. Preferably, one of the spot beam areas 20 overlaps with six other spot beam areas 20. By overlapping the spot beam areas 20, the spot beams may provide saturation coverage of all populated land areas of the Earth. In fact, the spot beams areas 20 may completely cover all surface areas, i.e., land and water areas, of the Earth.

The spot beam RF signals of overlapping spot beam areas 20 operate on different frequencies and/or different polarizations to prevent interference between the overlapping spot beam areas 20. Specifically, and as shown in FIG. 5, the system 10 of the illustrated embodiments provides four unique combinations of RF signal frequencies and/or polarizations to prevent interference. These different combinations are labeled on FIG. 5 as "A", "B", "C", and "D". Accordingly, these four combinations allow each spot beam area 20 to only ¼ of the total bandwidth for the satellite 12. Thus, the total bandwidth of each satellite 10 is over 1000 times that of a conventional communication satellite as each spot beam can carry a full ¼ of the total bandwidth of the satellite 12.

The power output of each feed horn 16 may be individually controlled. As a result, the spot beams covering higher latitudes and further longitudes from the orbital slot of the satellite 12 can carry higher power in order to penetrate greater atmospheric thickness and compensate for beam-spread over larger spot beam areas 20, without exceeding regulatory restrictions on signal-flux density. Furthermore, power to spot beams experiencing local atmospheric interference such as, but not limited to rain fades and sunspots, can be temporarily increased in order to penetrate such interference. Moreover, power to spot beams experiencing emergencies can be temporarily increased as required.

Referring again to FIGS. 1 and 2, each of the satellites 12 of the system is in communication with each of the other of the satellites 12. This communication is accomplished with an inter-satellite communications apparatus (not shown) disposed in each satellite 12. The inter-satellite communication apparatuses may utilizes RF signals, optical signal (e.g., lasers), or other suitable techniques as realized by those skilled in the art.

With the satellites 12 in communication with one another, and in communication with most, if not all, locations on the surface of the Earth, the system 10 may be utilized to provide direct communications between any two locations on Earth. For example, a person in the United States could use a transmitter to transmit a signal to one of the horns 16 of one of the satellites 12. This signal could then be transmitted to another of the satellites 12 via the inter-satellite communication apparatus. The other satellite 12 could then transmit the signal directly to another person with a receiver in any location, e.g., Australia. As such, global spot-to-spot communication is accomplished without the use of intermediary communication systems. In the second embodiment, seven satellites 12 are utilized to avoid the Earth blocking communication between two of the satellites 12. Specifically, if only six satellites were utilized, interference of communications between the satellites may occur from the Earth's electromagnetic umbra. As such, the use of seven satellites 12 permits communications between all the satellites 12 while providing complete global redundancy for all surface areas of the Earth.

The present invention has been described herein in an illustrative manner, and it is to be understood that the terminology which has been used is intended to be in the nature of words of description rather than of limitation. Obviously, many modifications and variations of the invention are possible in light of the above teachings. The invention may be practiced otherwise than as specifically described within the scope of the appended claims.

What is claimed is:

1. A global communication satellite system comprising:
   at least three communication satellites wherein each communication satellite is disposed in a geostationary orbit about the Earth;
   each communication satellite including a feed horn array having at least 4,000 feed horns with each feed horn capable of transmitting at least one radio frequency (RF) signal;
   said feed horn array producing a plurality of spot beams with each spot beam corresponding to a spot beam area on the surface of the Earth and with each spot beam area having a generally circular shape with a diameter less than 150 miles;
   each spot beam area overlapping with a plurality of other spot beams areas; and
   the plurality of spot beams providing saturation coverage of all populated land areas of the Earth.

2. A system as set forth in claim 1 wherein said at least three communication satellites is further defined as three communication satellites.

3. A system as set forth in claim 2 wherein said three communication satellites are spaced in geostationary orbits that are about 120 degrees from one another.

4. A system as set forth in claim 1 wherein said at least three communication satellites is further defined as seven communication satellites.

5. A system as set forth in claim 4 wherein said seven communication satellites are generally evenly spaced from one another in geostationary orbits.

6. A system as set forth in claim 1 wherein said feed horn array includes 4,310 feed horns.

7. A system as set forth in claim 6 wherein the diameter of each spot beam area is further defined as about 111 miles.

8. A system as set forth in claim 7 wherein the plurality of spot beams areas completely cover the surface of the Earth.

9. A system as set forth in claim 1 wherein each of said satellites is in communication with each of the other of said satellites.

10. A system as set forth in claim 1 wherein each feed horn is capable of receiving at least one RF signal.

11. A system as set forth in claim 1 wherein one of the spot beam areass overlaps with six other spot beam areas.

12. A system as set forth in claim 11 wherein the RF signal of the one of the spot beam areas operates at a different frequency and/or polarization than the RF signal of the six other spot beam areas.

13. A system as set forth in claim 1 wherein each communication satellite further includes a modified-spheroid parabolic reflector 18 disposed adjacent said plurality of feed horns for reflecting the RF signals between the feed horns and the Earth.

14. A global communication satellite system comprising:
at least three communication satellites wherein each communication satellite is disposed in a geostationary orbit about the Earth;
each communication satellite including a feed horn array having a plurality of feed horns with each feed horn capable of transmitting at least one radio frequency (RF) signal;
said feed horn array producing a plurality of spot beams with each spot beam corresponding to a spot beam area on the surface of the Earth;
each spot beam area overlapping with a plurality of other spot beams areas;
the plurality of spot beams providing saturation coverage of all populated land areas of the Earth;
wherein each of said satellites is in communication with each of the other of said satellites;
wherein said plurality of feed horns is further defined as at least 4,000 feed horns.

15. A system as set forth in claim 14 wherein said at least three communication satellites is further defined as seven communication satellites.

16. A system as set forth in claim 15 wherein said seven communication satellites are generally evenly spaced from one another in geostationary orbits.

* * * * *

UNITED STATES PATENT AND TRADEMARK OFFICE
CERTIFICATE OF CORRECTION

| | |
|---|---|
| PATENT NO. | : 8,339,309 B2 |
| APPLICATION NO. | : 12/889629 |
| DATED | : December 25, 2012 |
| INVENTOR(S) | : Brian McCandliss |

It is certified that error appears in the above-identified patent and that said Letters Patent is hereby corrected as shown below:

Column 5, Line 25, (claim 11) delete "beam areass" and add -- beam areas --.

Column 6, Line 20, (claim 14) delete "each of the other of said satellites;" and add -- each of the other said satellites; and --.

Signed and Sealed this
Fifth Day of March, 2013

Teresa Stanek Rea
*Acting Director of the United States Patent and Trademark Office*